(12) United States Patent
Pimpinella et al.

(10) Patent No.: US 12,532,085 B2
(45) Date of Patent: Jan. 20, 2026

(54) COMPUTATIONAL HIGH-SPEED HYPERSPECTRAL INFRARED CAMERA SYSTEM

(71) Applicants: Richard Edward Pimpinella, Oswego, IL (US); Christopher Frank Buurma, Columbus, OH (US); Nigel D. Browning, Formby (GB)

(72) Inventors: Richard Edward Pimpinella, Oswego, IL (US); Christopher Frank Buurma, Columbus, OH (US); Nigel D. Browning, Formby (GB)

(73) Assignee: Sivananthan Laboratories, Inc., Bolingbrook, IL (US)

( * ) Notice: Subject to any disclaimer, the term of this patent is extended or adjusted under 35 U.S.C. 154(b) by 0 days.

(21) Appl. No.: 17/739,825

(22) Filed: May 9, 2022

(65) Prior Publication Data

US 2022/0408035 A1    Dec. 22, 2022

Related U.S. Application Data

(60) Provisional application No. 63/185,940, filed on May 7, 2021, provisional application No. 63/185,934, filed on May 7, 2021.

(51) Int. Cl.
*H04N 25/44* (2023.01)
*G06T 5/77* (2024.01)

(52) U.S. Cl.
CPC ............... *H04N 25/44* (2023.01); *G06T 5/77* (2024.01); *G06T 2207/10024* (2013.01); *G06T 2207/10036* (2013.01); *G06T 2207/10048* (2013.01); *G06T 2207/20221* (2013.01)

(58) Field of Classification Search
CPC .......... H04N 23/11; H04N 25/44; H04N 5/33; G06T 5/005; G06T 2207/10024; G06T 2207/10036; G06T 2207/10048; G06T 2207/20221

See application file for complete search history.

(56) References Cited

U.S. PATENT DOCUMENTS

| | | |
|---|---|---|
| 4,956,686 A | 9/1990 | Borrello et al. |
| 5,196,703 A | 3/1993 | Keenan |
| 5,431,328 A | 7/1995 | Chang et al. |
| 5,479,032 A | 12/1995 | Forrest et al. |
| 5,518,934 A | 5/1996 | Forrest et al. |
| 5,581,084 A | 12/1996 | Chapman et al. |
| 6,580,509 B1 | 6/2003 | Hutchin et al. |
| 6,657,194 B2 | 12/2003 | Ashokan et al. |

(Continued)

OTHER PUBLICATIONS

Pekkala et al. "Setup for characterizing the spectral responsivity of Fabry-Perot-interferometer-based hyperspectral cameras", Metrology Research Institute, Aalto University, Oct. 10, 2019.*

(Continued)

*Primary Examiner* — James T Boylan
(74) *Attorney, Agent, or Firm* — Erickson Law Group, PC.

(57) ABSTRACT

A hyperspectral infrared imaging system includes optical components, multi-color focal plane array or arrays, readout electronics, control electronics, and a computing system. The system measures a limited number of spatial and spectral points during image capture and the full dataset is computationally generated.

9 Claims, 4 Drawing Sheets

(56) References Cited

U.S. PATENT DOCUMENTS

| | | |
|---|---|---|
| 7,462,831 B2 | 12/2008 | Gooch et al. |
| 7,840,086 B2 | 11/2010 | Bertozzi et al. |
| 8,233,148 B2 | 7/2012 | Bodkin et al. |
| 8,570,442 B2 | 10/2013 | Mestha et al. |
| 9,410,850 B2 | 8/2016 | Novotny et al. |
| 9,467,628 B2 | 10/2016 | Geng et al. |
| 9,538,098 B2 | 1/2017 | Hoye et al. |
| 9,883,178 B2 | 1/2018 | Chiu et al. |
| 9,921,106 B1* | 3/2018 | Davis .................. G01J 3/1895 |
| 10,139,276 B2 | 11/2018 | Killey |
| 10,224,175 B2 | 3/2019 | Steven et al. |
| 10,256,072 B2 | 4/2019 | Steven et al. |
| 10,373,339 B2 | 8/2019 | Miller et al. |
| 10,431,419 B2 | 10/2019 | Kovarik et al. |
| 10,740,881 B2 | 8/2020 | Wang et al. |
| 11,056,314 B2 | 7/2021 | Hujsak et al. |
| 11,080,833 B2 | 8/2021 | Barnes et al. |
| 2007/0097363 A1* | 5/2007 | Brady .................. G01J 3/0229 356/310 |
| 2013/0016284 A1* | 1/2013 | Mestha .................. G06T 5/50 348/E5.062 |
| 2013/0083312 A1* | 4/2013 | Baraniuk .............. G01J 3/0229 356/402 |
| 2013/0128042 A1* | 5/2013 | Bridge .................. H04N 23/60 348/143 |
| 2017/0284867 A1* | 10/2017 | Gensemer ............. G01J 3/0221 |
| 2017/0316916 A1* | 11/2017 | Stevens ................ H01J 37/222 |
| 2018/0284273 A1* | 10/2018 | Buettgen ............... G01B 11/00 |
| 2018/0293331 A1* | 10/2018 | Olson .................... G06F 17/18 |
| 2019/0257987 A1* | 8/2019 | Saari .................... H04N 13/207 |
| 2021/0080484 A1* | 3/2021 | Piestun .................. G01Q 30/04 |
| 2022/0408035 A1* | 12/2022 | Pimpinella ............ G01J 3/2823 |

OTHER PUBLICATIONS

Martin-Mateos et al. "Direct Hyperspectral dual-comb imaging" Article in Optica, Jan. 2020.*

* cited by examiner

COMPUTATIONAL HIGH-SPEED HYPERSPECTRAL INFRARED CAMERA SYSTEM

This invention claims the benefit of U.S. Provisional Application Ser. No. 63/185,940 filed May 7, 2021 and 63/185,934 filed May 7, 2021.

BACKGROUND OF THE INVENTION

Hyperspectral imaging in the infrared collects and processes infrared radiation in such a way as to produce an infrared spectrum at every pixel in the image. The information obtained by a hyperspectral imaging system can be utilized to perform spatially correlated chemical analysis to identify objects and chemicals in a scene. A single picture produced by a hyperspectral imaging system containing the spectral information is commonly referred to as the hyperspectral data cube. Commonly, hyperspectral imaging systems consist of an infrared focal plane array and optics to separate the spectral components of the incident infrared radiation. The Imagers produce the hyperspectral data cube by either acquiring a set of snapshots of constant spectral components, or a single spatial line of the entire spectrum. The hyperspectral data cube is built through acquiring a series of scans.

Examples of hyperspectral imaging systems are described in U.S. Pat. Nos. 6,580,509; 8,233,148; 8,570,442; 9,538,098; 9,921,106; 10,139,276; and 10,373,339, all herein incorporated by reference to the extent the contents are not contrary to the present disclosure.

Some inpainting methods are known, such as disclosed in U.S. Pat. No. 7,840,086, hereby incorporated by reference to the extent the contents are not contrary to the present disclosure.

The reconstruction of high-resolution images is possible using only a fraction of the original pixels and a computational method. However, this reference is directed to color or greyscale images.

U.S. Pat. No. 10,256,072 herein incorporated by reference to the extent the contents are not contrary to the present disclosure, describes high quality images obtained from electron microscopes where there are a significant number of missing pixels. Eliminating a high percentage of the pixels can still result in an image with negligible loss in quality. Other inpainting methods are known, such as disclosed in U.S. Pat. No. 10,224,175, herein incorporated by reference to the extent the contents are not contrary to the present disclosure.

The present inventors have recognized that the performance and spectral or spatial resolution of hyperspectral systems is fundamentally limited by the acquisition time associated with scanning. For dynamic scenes, motion of the camera system and objects in the scene will create artefacts in the hyperspectral data cube and can render the data useless.

The present inventors have recognized that it would be desirable to increase performance, reliability and resolution of hyperspectral systems in a cost-effective manner.

SUMMARY

An exemplary embodiment of a hyperspectral infrared imaging system includes optical components, multi-color focal plane array or arrays, readout electronics, control electronics, and a computing system. The system measures a limited number of spatial and spectral points during image capture and the full dataset is computationally generated.

For IRFPAs, the implementation of inpainting means that after manufacturing, up to 95% of the lowest quality pixels can be eliminated from the image acquisition with negligible loss in the resulting contrast, resolution and sensitivity of the images.

The system can include a coded aperture.
The system can include a set of spectral filters.
The system can include an interferometer.
The system can include a comb filter.
The system can operate in a manner in which a subset of pixels is not read during operation and replaced by the computing system.
The system can operate in a manner in which a subset of the spectral wavelengths is not read during operation and is replaced by the computing system.
The system can operate in a manner in which the spectral sensitivity of the pixels is known but not uniform and/or constant in space and/or time.
The system can include at least one of dispersive, translational, or focusing elements such that the input light to the system can contain multiple wavelengths possibly overlapping in space but can be moved with respect to the image plane and acquire images with different levels of defocus.
The system can operate in a manner in which the optics provide each pixel with more than one spectral band which is later spectrally reconstructed by the computing system.

By leveraging compressed sensing techniques for infrared hyperspectral imaging, it is possible to greatly reduce the acquisition time and therefore increase the performance of the imaging system. Acquisition time is important to hyperspectral imaging of dynamically changing scenes. By employing compressed sensing and inpainting, it is possible to optimize the data collection rate and reconstruct the hyperspectral data cube with acceptable or no information loss. This is accomplished by capturing a subset of the spectra at each pixel and reconstructing the information from spectral information provided by neighboring pixels. Under-sampling hyperspectral data cube and inpainting can achieve lossless or near lossless reconstruction.

Under-sampling can be accomplished by, for example:
Pixel independent spectral filtering,
Optical comb filters,
Partial spectral scans,
Printed multicolor CQD pixels, or
Rotating non-uniform spectral filter.

Numerous other advantages and features of the present invention will be become readily apparent from the following detailed description of the invention and the embodiments thereof, and from the accompanying drawings.

DETAILED DESCRIPTION

Figure 1:
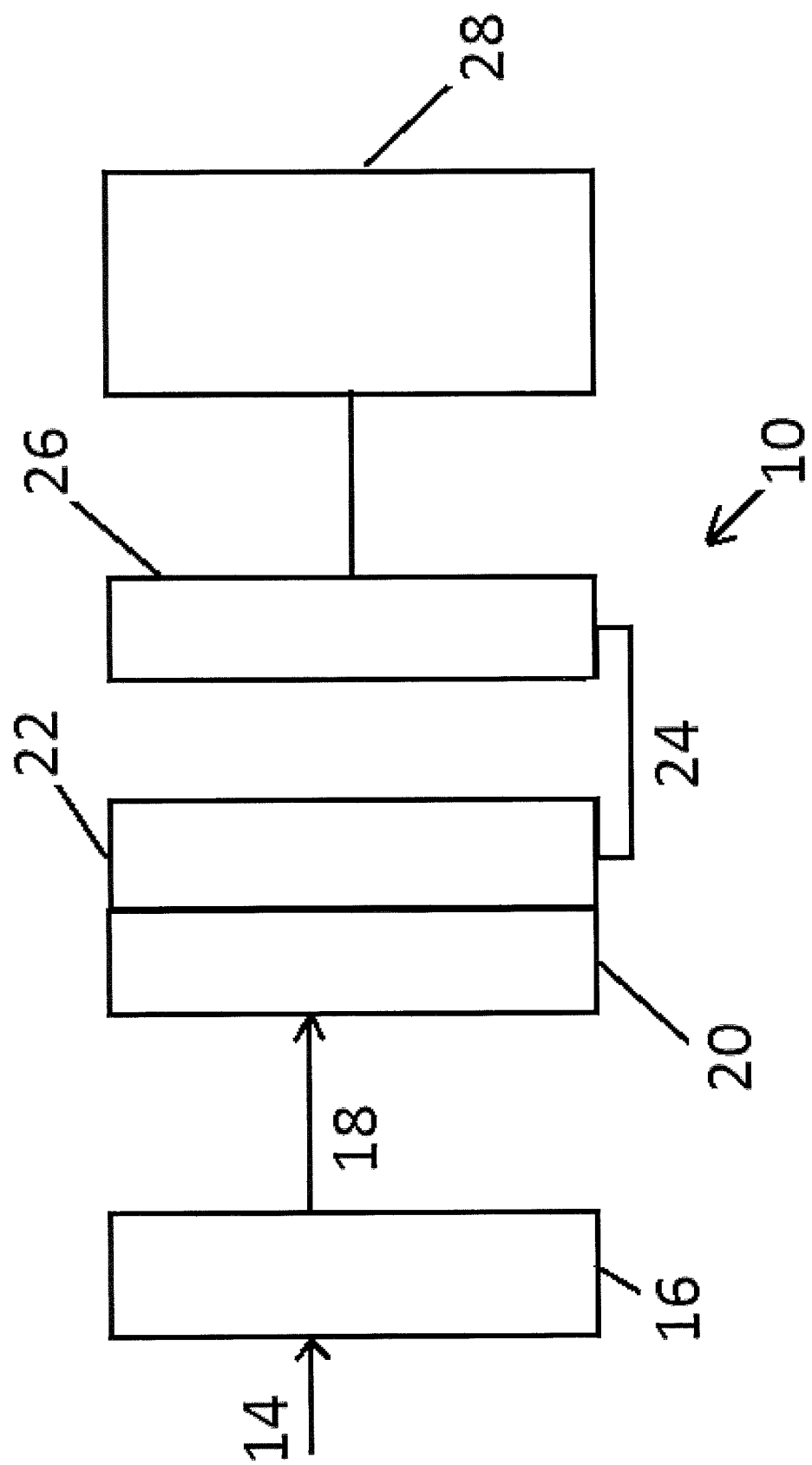
FIG. 1 is a schematic view of an exemplary system of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates U.S. provisional Application Ser. No. 63/185,940 filed May 7, 2021; U.S. Provisional Application Ser. No. 63/185,934 filed May 7, 2021; U.S. Pat. No. 10,256,072 and U.S. Ser. No. 17/687,170 filed Mar. 4, 2022 in their entireties to the extent that they are not contrary to the teaching of the present disclosure.

FIG. 1 illustrates in schematic form an exemplary embodiment of a hyperspectral infrared imaging system 10. The system 10 includes optical components 16 receiving infrared radiation 14, multi-color focal plane array or arrays (Infrared Focal Plane Array or "IRFPA") 20 receiving infrared radiation from the optical components 16, readout electronics 22, such as a read-out integrated circuit (ROIC), generating signals 24, control electronics 26 receiving the signals, and a computing system 28. The system measures a limited number of spatial and spectral points during image capture and the full dataset is computationally generated in the computing system 28. IRFPA structures are described in U.S. Pat. Nos. 4,956,686; 5,479,032; 5,518,934; 6,657,194 and 9,883,178 herein incorporated by reference to the extent they are not contrary to the present disclosure. ROIC structures are described in U.S. Pat. Nos. 9,410,850; 5,431,328; 7,462,831; 5,196,703; 6,657,194 and 5,581,084, herein incorporated by reference to the extent they are not contrary to the present disclosure.

The system can include a coded aperture.

The system can include a set of spectral filters.

The system can include an interferometer.

The system can include a comb filter.

The system can operate in a manner in which a subset of pixels is read and a subset of pixels is not read during operation and replaced by the computing system. The computing system can use inpainting to construct a full dataset from the subset of pixels read.

The system can operate in a manner in which the spectral sensitivity of the pixels is known but not uniform and/or constant in space and/or time.

The system can include at least one of dispersive, translational, or focusing elements such that the input light to the system can contain multiple wavelengths possibly overlapping in space but can be moved with respect to the image plane and acquire images with different levels of defocus.

The system can operate in a manner in which the optics provide each pixel with more than one spectral band which is later spectrally reconstructed by the computing system.

Figure 2:
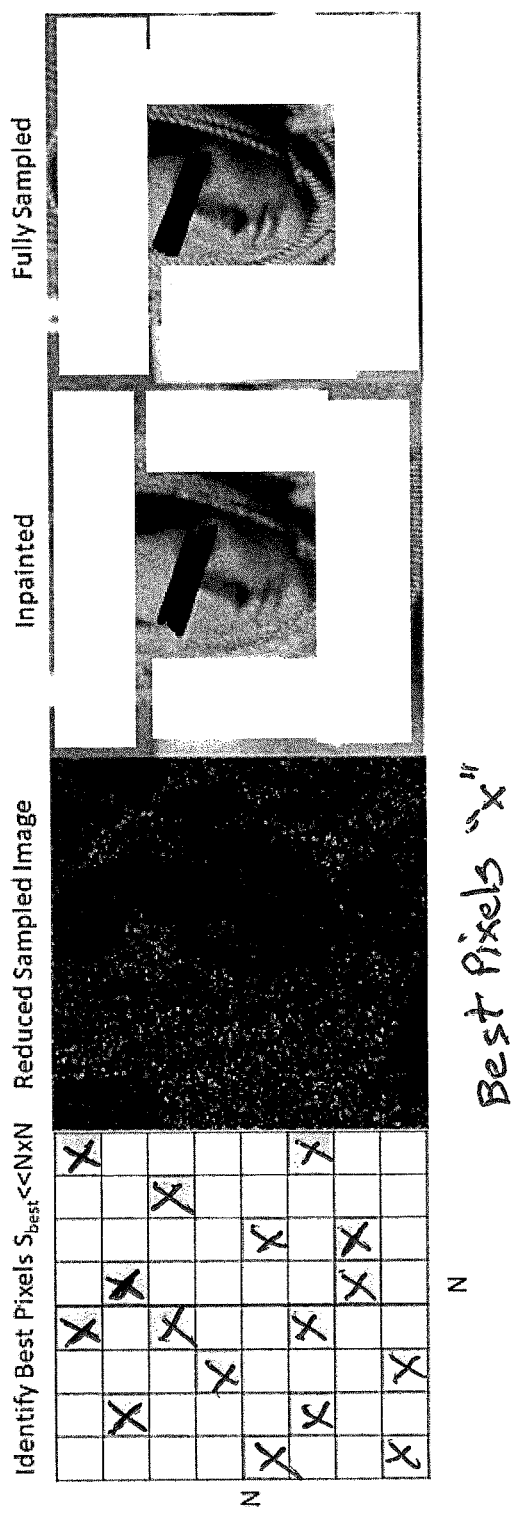
FIG. 2 is a demonstrative figure showing a method of inpainting using best pixels, some portions of the images have been redacted.
Figure 3:
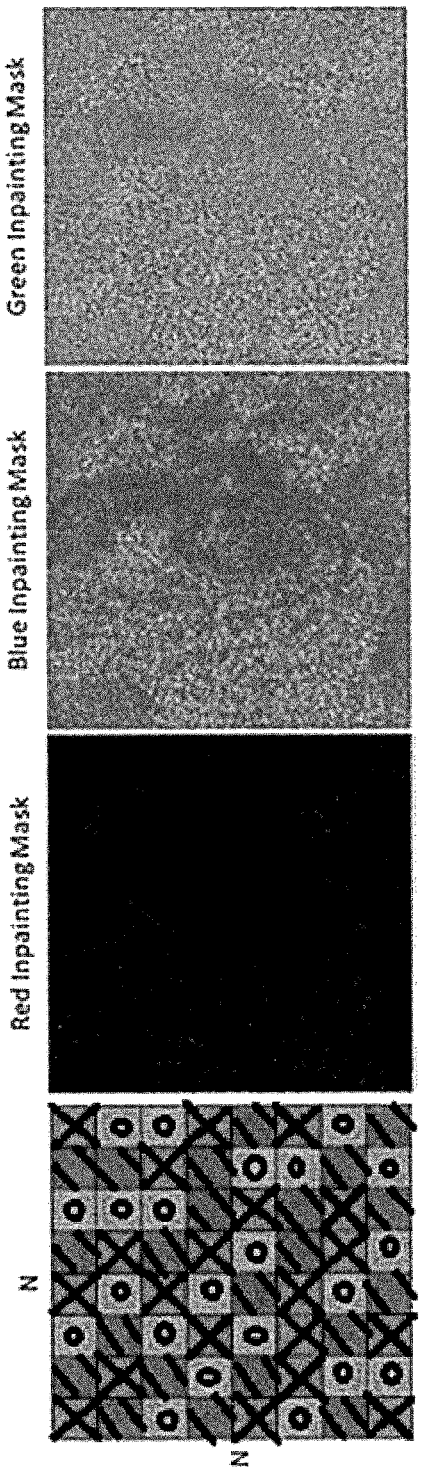
FIG. 3 is a demonstrative figure showing a method of inpainting using best pixels for three wavelengths of light, red, blue and green.

FIGS. 2 and 3 demonstrate a three-color example of the use of hyperspectral images.

Figure 4:
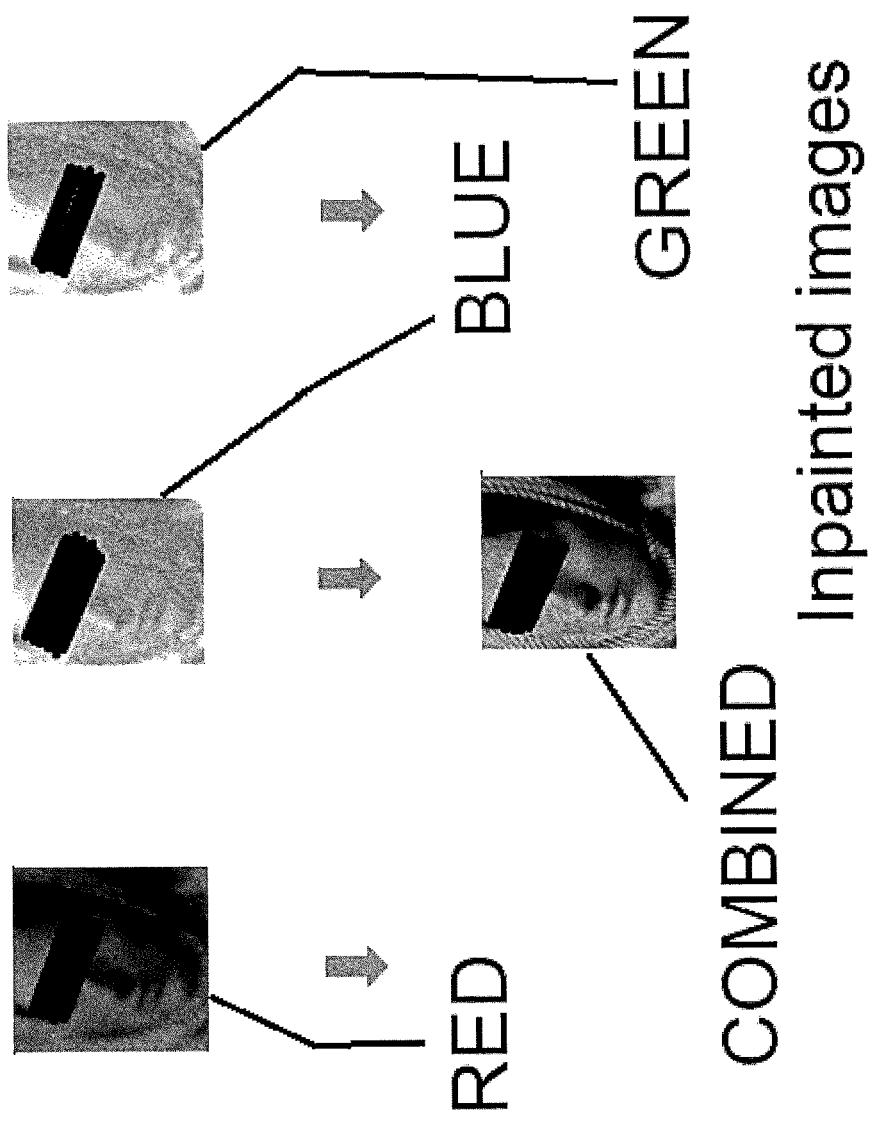
FIG. 4 is a demonstrative figure showing inpainted images using the masks shown in FIG. 3 and a combined image, some portions of the images have been redacted.

As shown in FIG. 3, the same array IRFPA can be illuminated with multiple wavelengths to identify the best performing pixels for SWIR, LWIR and MWIR, for example. These pixels form the masks for the individual color images that can be combined together to form an inpainted hyperspectral image shown in FIG. 4.

The initial step is to determine which pixels in the camera are most sensitive to each selected wavelength—this is done by illuminating the camera with a single wavelength and mapping the response. This only needs to be done once per wavelength and can be done during the manufacture of the camera. Once the best pixels for each wavelength are identified, those pixels become the sub-sampled mask for that wavelength. The software correlates that wavelength to a color, e.g., red, green or blue.

From the total image, a red image is inpainted from the best red pixels, a green image is inpainted from the best green pixels and a blue image is inpainted from the best blue pixels. The separation of the pixels into colors is performed by the software, as is the inpainting.

When the whole image is read out, it contains red, blue and green sub-sampled images that are reconstructed using inpainting methods. Accordingly, scanning over a large range of different images for the different energy range is not required, all the information is in a single image.

If the whole imaging array is used for the hyperspectral data cube then the detector will have the regular read-out performance, i.e., speed. If a smaller number of pixels is used for read-out, then the detector can balance read-out speed against the breadth of the hyperspectral datacube.

Sub-sampling and inpainting algorithms are disclosed in U.S. Pat. Nos. 7,840,086; 10,224,175 and 10,256,072 herein incorporated by reference to the extent that they are not contrary to the present disclosure. Other inpainting techniques are known and examples are described in U.S. Pat. Nos. 9,467,628; 10,431,419; 11,056314; 10,740,881 and 11,080,833 herein incorporated by reference to the extent that they are not contrary to the present disclosure.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A hyperspectral infrared imaging system comprised of:
optical components,
multi-color focal plane array or arrays having pixels and in light-communication with the optical components,
readout electronics in signal communication with the pixels,
control electronics in signal-communication with the readout electronics, and
a computing system, in signal-communication with the control electronics,
which, during manufacturing, the focal plane array is illuminated with multiple preselected different wavelengths of radiation one wavelength at a time, and the computing system measures and preselects higher sensitivity pixels for each of the multiple preselected different wavelengths, forming multiple subsets of pixels,
the multiple subsets of pixels forming a plurality of sub-sampled masks,
and during image capture, when the focal plane array receives a total image, each sub-sampled mask is inpainted by the computing system,
creating a sub-image from each sub-sampled mask, and a full dataset of spatial and spectral points is computationally generated by combining the sub-images.

2. The system as in claim 1, wherein the multiple preselected different wavelengths comprise three wavelengths.

3. The system as in claim 1, wherein the multiple preselected different wavelengths consists of three wavelengths.

4. The system as in claim 1, wherein the system includes a coded aperture.

5. The system as in claim 1, wherein the system includes a set of spectral filters.

6. The system as in claim 1, wherein the system includes an interferometer.

7. The system as in claim 1, wherein the system includes a comb filter.

8. The system as in claim 1, wherein the system includes at least one of dispersive, translational, or focusing elements such that the input light to the system can contain multiple wavelengths overlapping in space and can be moved with respect to the image plane and acquire images with different levels of defocus.

9. The system as in claim 1, in which the optical components provide each pixel with more than one spectral band which is later spectrally reconstructed by the computing system.

* * * * *